Aug. 4, 1936.  J. A. McCASKELL  2,050,061
FIBER UTENSIL
Filed July 25, 1934
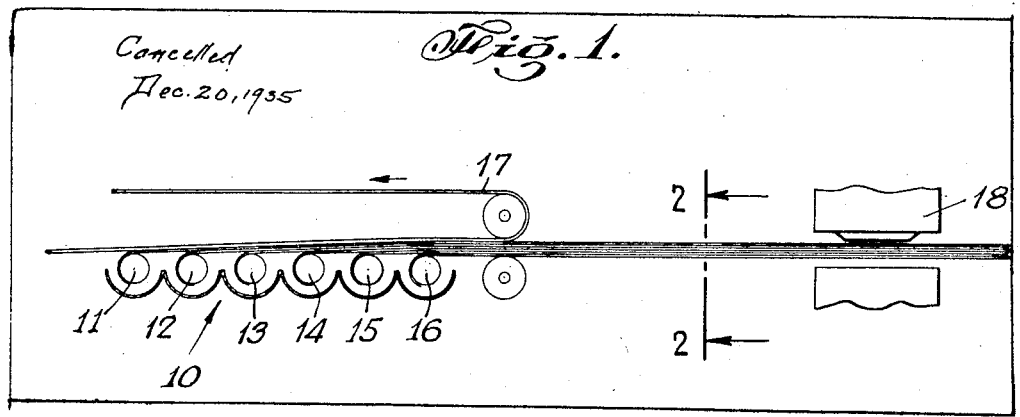
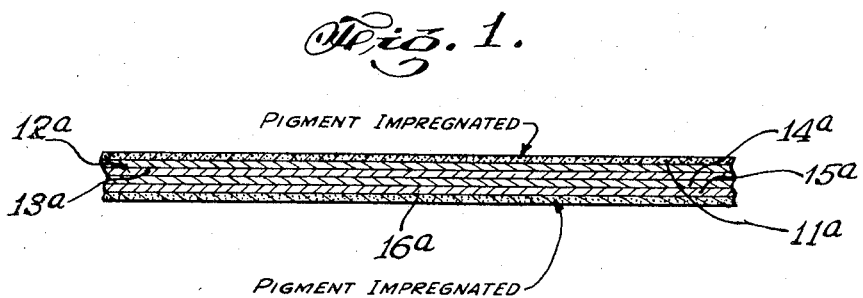
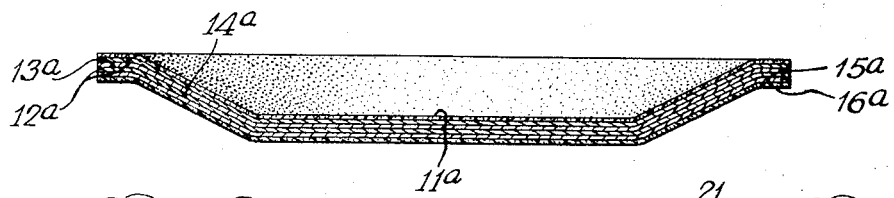
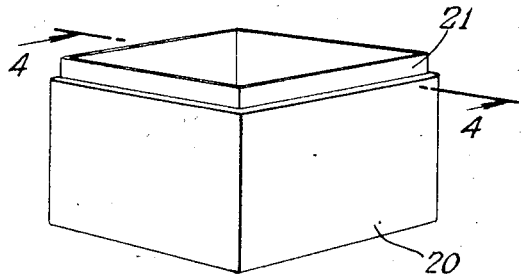
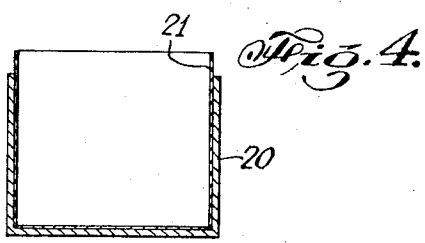
INVENTOR
Jasper A. McCaskell
BY
ATTORNEYS Patented Aug. 4, 1936

2,050,061

UNITED STATES PATENT OFFICE 2,050,061

FIBER UTENSIL

Jasper A. McCaskell, Philadelphia, Pa., assignor to William M. McCaskell, Philadelphia, Pa.

Application July 25, 1934, Serial No. 736,850

6 Claims. (Cl. 53—6)

This invention relates to improvements in fiber utensils and to an improved method of manufacture thereof.

It has heretofore been suggested that fiber board could be suitably treated to be heat resistant and by suitable molding or stamping, could be made into cooking utensils including pie plates. Such pie plates and other baking and cooking utensils, however, have been unsatisfactory due to being expensive, unstable, subject to discoloration and in some cases they have had an objectionable reaction on the food products.

It is one of the principal objects of my invention to provide an improved process for making fiber cooking or baking utensils which consists in impregnating a pulp of a fibrous material, which may be bleached, with a pigment or pigments and then making a fiber board with the impregnated pulp as outer layers, or molding the impregnated pulp so that the final formed plate or utensil will have an opaque, uniform color, a smooth surface, and due to the improved heat resisting qualities, it will be free from discoloration in use.

Another object of the invention is to provide an improved cooking utensil which has a pigment impregnated top layer and a pigment impregnated bottom layer, which may be acid, neutral or alkaline in reaction, and due to the impregnated pigment, is stable, of increased strength as compared to prior structures, less costly to manufacture, and in which the opaque surface can not peel off or be loosened regardless of the generation of heat or moisture.

Another object of the invention is to provide an improved fiber service plate which has a pigment impregnated top layer and a pigment impregnated bottom layer, which is not discolored during the service of hot or cold food due to the opaque surfaces and any grease, even if absorbed by the fiber, will not show through.

Another object of the invention is to provide an improved pie plate having a plurality of layers of fiber board which are preferably formed from pulp on a multicylinder paper forming machine or which may be formed by molding processes, in which the pulp is mixed with titanium dioxide or other substantially non-toxic pigment or pigments and with suitable precipitants, so that the pulp fibers are so coated and impregnated that the resultant plate is highly heat resistant and the opacity of the outer layers is sufficient to prevent any structural change of the filler layers from showing through.

A still further object of this invention is to provide an opaque surface on a cooking utensil which will withstand the heat, moisture and acid conditions of baking fruit and other pies, and will remain unspoiled during cooking and will prevent absorbed grease of the fiber filler of the plate from showing through, and in which the surface layer will be smooth and of substantially uniform thickness for solid color and uniform heat transfer, and yet the utensil is less expensive to manufacture in time, labor and materials than utensils which are dipped, sprayed or made by heretofore known methods.

Other objects and advantages of my invention will appear from the following description thereof taken in connection with the attached drawing which illustrates a preferred form of embodiment thereof and in which:

Figure 1 is an enlarged section of the several plies of a fiber board as described herein, Figure 2 is a central vertical cross section through a pie plate showing in exaggerated fashion, the details of the construction, Figure 3 is a perspective of a baking box with a removable liner, and Figure 4 is a vertical cross section of the box of Fig. 3, taken substantially along the line 4—4.

My improved fiber utensil which is particularly adapted for use as a pie plate in the cooking of fruit or other types of pies, is preferably formed from fiber board which may include a plurality of plies of fiber material such as simultaneously made on a multi-cylinder paper making machine and which is subsequently passed through a suitable press or other forming machine capable of stamping out the desired shape and size products. In a preferred form of embodiment of my invention, I preferably use ordinary craft pulp to form the usual brown filler plies 12a, 13a, 14a, and 15a as shown in Figure 1. If desired, these filler plies may be initially impregnated with a small percentage of sodium silicate with or without alum which increases the strength and rigidity of the finished board and also acts as a heat resisting element.

In addition to this filler, I prefer to use two additional fiber sheets for the outside of the plates and these are preferably of a bright clear white color. For the top most or inner layer 11a, of the fiber board, for example, I may use approximately 88 parts of dry pulp with which has been mixed approximately 2 parts of casein or rosin and 3 parts of alum as precipitants and 7 parts of titanium dioxide or other non-toxic pigment. The dry pulp is preferably bleached craft pulp although unbleached or bleached sulfite pulp may be used and it is diluted with the necessary water to obtain the proper consistency to form the paper in the paper machine.

I prefer to use titanium dioxide as the pigment for the inside or food contacting side, due to its great covering power in a water solution, its inertness, its sanitary qualities and its white color. The inertness is especially important in view of the numerous acids in cooking, especially fruit juices in pies, which however, will not attack titanium dioxide. Furthermore, the addition of titanium dioxide forms a fully impregnated fiber board which gives a distinct opacity to the plate and grease that would normally be absorbed by the plate, is prevented from penetrating the outer layers so that the plate will be fully white after the pie has been baked thereon. I can however, use zinc oxide, zinc sulfite, or lithopone which is a mixture of zinc sulfite and barium sulfate or any other non-toxic pigment, especially the white ones. I can also use metallic powders such as aluminum dust.

The bottom coat or layer 16a of the plate is similarly formed from an impregnate pulp, although I prefer to use an unbleached sulfite pulp as it costs less than bleached sulfite pulp. One suitable formula that I have found to be satisfactory includes pulp, approximately 82%; sodium silicate 5%; alum 3%; and titanium dioxide or other pigment 7% to 10%; depending on the whiteness desired, such percentages being based on the weight of the dry pulp. This layer may be slightly alkaline or neutral as desired. It is not essential that it be neutral as it does not come directly in contact with the food. It is opaque however, and any absorption of grease or other discolorization of the filler by heat will not show through, thus making the pie plate or utensil of a clear white color on both sides.

After production of the respective layers, and after any additional water dilution that may be found desirable, the fiber board is passed through a suitable press which forms, drys and turns out the finished plates.

Preferably the forming step occurs directly after the plies are formed and before the board is finally dried and calendared inasmuch as the fiber board is more pliable and will form a smoother surface than if the board were fully finished. The plates will therefore be free from compression wrinkles when stamped. There will be no premature setting of the filler pulp while the board is wet as it would if the board were completely dried. If the board is completely calendared however, it will be necessary to dip the board in water for an additional length of time to make it sufficiently pliable for forming in the stamping presses. The former method is least expensive inasmuch as the extra time and the extra steps of drying and remoistening are eliminated.

After the fiber board plate is completely formed, moisture has no effect on the surface. The pigment, being combined with the fiber under pressure, cannot soften or peel off. Furthermore, the percentage of pigment is more uniformly distributed where it has been impregnated in the fiber board plate and there will be a uniformity in the thickness and therefore the color of the outer layers will be uniform. This is impossible in case of sprayed plates because of the settling of the enamel in the bottom during spraying of the sides of the plates. I am also able to get a better heat transfer through the walls of the plate which is probably due also to the uniform thickness and dispersion of the pigment layer.

The fiber board plate may be white lined on either or both sides of the board and preferably it is white lined on both sides. The inside surface of the plate may be neutral or slightly acid if desired when the board is used for making pie plates, while other baking utensils such as baking boxes and generally for the outside it is not absolutely necessary to have the neutral layer. This type of pie plate will not deteriorate at baking temperatures and due to its opacity, any possible change in the lining would not show through. The use of sodium silicate, in the exterior layers, however, prevents any change. The plate is therefore rigid, stable and inexpensive, and can be made uniform in production manufacture.

Charring of the plate even without sodium silicate is avoided probably because of the precipitation of pigment, by alum and the rosin or casein on the fibers of the paper material. I find it not absolutely essential to use sodium silicate as neither side of the plate is apparently affected when under normal oven temperatures required for baking. Sodium silicate is used in the bottom layer and in the exterior in the preferred structure however, because it strengthens the plate and it has an added heat resisting factor.

Adding the pigment to the raw pulp material prior to the formation of the finished articles brings about a material saving in labor, equipment, power, heat for drying and eliminates paint losses incident to spraying. Furthermore, it gives the plate better heat resistant qualities and prevents any noticeable change in the structure even after use.

It is of course to be understood that pulp may be molded into utensil form in the usual manner and if the requisite amount of pigments and precipitants are added to the pulp so as to completely cover the individual fibers of the pulp with a coating of inert material, a superior article will result. In a similar manner paper board made by the Fourdrinier process can also be used for making baking plates by adding the requisite amount of pigment to the paper pulp prior to formation.

A modified form of construction of fiber utensil is shown in Figures 3 and 4. In this form of embodiment of my invention, I provide a baking box 20 which may be of any desired size or shape and which may be made of my improved pigment treated pulp. If desired, the box 20 may be lined with glassine, parchment or other paper and such liner 21 may be removable if desired. It is unimportant in this form of construction whether the fiber board is of acid, neutral or base reaction as the products to be cooked do not come in direct contact with the fiber board but only in contact with the liner. This makes it possible to select the least expensive material for the fiber board. It is however, preferably treated with a pigment as heretofore described. Such a container is especially desirable for cooking cakes or other products.

While I have described preferred forms of embodiment of my invention, I am aware that other modifications may be made thereto and I therefore desire a broad interpretation of my invention within the scope and spirit of the description herein and of the claims appended hereinafter.

I claim:

1. A laminated fiber pie plate of the class described for cooking and transporting pie which comprises a relatively stiff body portion of craft pulp having an impregnated heat resisting material, and a plurality of cover portions for the top and bottom of the plate, said cover portions being relatively thin paper pulp, opaque, dense and having a color closely approaching white so that after baking of a pie in the plate, the plate will be of a clean white color during shipment and handling of the pie.

2. A laminated fiber cooking utensil of the class described for cooking food products to be transported in the utensil which comprises a plurality of layers of paper pulp, the center layers being relatively stiff and having an impregnated heat resisting material, the outer layers being relatively thin and having a mechanically precipitated pigment whereby said outer layers are opaque, rigid and non-charring at oven temperatures of food cooking, said layers being compacted and formed in the shape of the utensil, the outer layer retaining its clean color during cooking whereby the utensil will have a clean color during shipment.

3. A fiber cooking utensil comprising a plurality of layers of paper pulp, the center layers of which are treated with a heat resisting material, the bottom layer being impregnated with a binder, sodium silicate and a non-toxic pigment, said outer layer having an alkaline reaction and a substantially white color, said color being stable under baking conditions whereby said utensil may be used to transport cooked food products and will maintain its attractive appearance.

4. A fiber cooking utensil for the cooking and transporting of baked food products which comprises a plurality of layers of paper pulp, the intermediate layers being relatively rigid, the outer layers being relatively thin, hard and opaque and having a mechanically precipitated inert pigment, the layer against which the food is in contact being neutral in reaction, the bottom layer preserving its clean color during cooking for use during shipment and handling of the cooked food product.

5. A fiber cooking utensil of the class described comprising an inner surface layer, a body portion and an outer bottom layer, said inner surface layer consisting of a paper pulp with a mechanically precipitated pigment of the class of titanium dioxide, said surface being opaque, dense and having a neutral or slightly acid reaction; the body portion consisting of a plurality of layers of craft pulp having a small percentage of a heat resisting element; the outer or bottom layer consisting of a sulfite pulp with a mechanically precipitated non-toxic pigment coating the fibers thereof, said outer layer being impregnated with sodium silicate and having an alkaline reaction and being substantially white, said color being stable under cooking conditions.

6. A laminated fiber cooking utensil of the class described for cooking food products to be transported in the utensil which comprises a plurality of layers of paper pulp, the center layers being relatively stiff and having an impregnated heat resisting material, the outer layers being relatively thin and impregnated with a metal powder whereby said outer layers are opaque, rigid and non-charring at oven temperatures of food cooking, said layers being compacted and formed in the shape of the utensil, the outer layer retaining its clean color during cooking whereby the utensil will have a clean color during shipment.

JASPER A. McCASKELL.